(12) United States Patent
Shinsho

(10) Patent No.: US 7,391,813 B2
(45) Date of Patent: Jun. 24, 2008

(54) DIGITAL WIRELESS COMMUNICATIONS DEVICE

(75) Inventor: Eiji Shinsho, Tokyo (JP)

(73) Assignee: Uniden Corporation (JP)

( * ) Notice: Subject to any disclaimer, the term of this patent is extended or adjusted under 35 U.S.C. 154(b) by 635 days.

(21) Appl. No.: 11/010,691

(22) Filed: Nov. 19, 2004

(65) Prior Publication Data

US 2006/0029140 A1 Feb. 9, 2006

(30) Foreign Application Priority Data

Aug. 9, 2004 (JP) ............................. 2004-232026

(51) Int. Cl.
*H04B 14/04* (2006.01)

(52) U.S. Cl. ...................... 375/242; 375/241; 375/243; 375/244; 375/245; 375/316; 704/212

(58) Field of Classification Search ......... 375/241–245, 375/248–249, 254, 318, 330, 217, 316; 455/212–214, 455/218, 222–223; 704/212
See application file for complete search history.

(56) References Cited

U.S. PATENT DOCUMENTS

| | | | | |
|---|---|---|---|---|
| 4,475,227 | A | * | 10/1984 | Belfield ...................... 704/212 |
| 5,309,443 | A | * | 5/1994 | Schorman ................... 714/708 |
| 5,319,573 | A | * | 6/1994 | Corleto et al. .............. 700/280 |
| 5,799,039 | A | * | 8/1998 | Laird et al. ................. 375/244 |
| 5,925,146 | A | * | 7/1999 | Murata et al. ............... 714/746 |
| 5,928,379 | A | * | 7/1999 | Hattori ....................... 714/807 |
| 6,029,128 | A | * | 2/2000 | Jarvinen et al. ............ 704/220 |
| 6,578,162 | B1 | * | 6/2003 | Yung .......................... 714/708 |
| 6,914,940 | B2 | * | 7/2005 | Tanaka et al. ............... 375/254 |
| 7,272,554 | B2 | * | 9/2007 | Serizawa et al. ........... 704/219 |

FOREIGN PATENT DOCUMENTS

| | | |
|---|---|---|
| JP | 2002-006890 | 1/2002 |
| JP | 2002-006891 | 1/2002 |

* cited by examiner

*Primary Examiner*—Mohammed Ghayour
*Assistant Examiner*—Sophia Vlahos
(74) *Attorney, Agent, or Firm*—Steven J. Hultquist; Intellectual Property/Technology Law

(57) ABSTRACT

A digital wireless communications device enabling call distance to be increased while avoiding mute processing as far as possible, even if code error occurs in an ADPCM code. The digital wireless communications device may be configured to include: an error detector for detecting code error in an ADPCM code received via a wireless circuit; an ADPCM decoder for generating a PCM signal by decoding the ADPCM code; and a substitution unit for determining that a click noise is generated if the high-speed scale factor and the low-speed scale factor determined by the ADPCM decoder within a predetermined time period after the error detector has judged that there is a code error in the ADPCM code, and the received ADPCM code itself, respectively exceed prescribed threshold values, and for substituting the ADPCM code with a predetermined prescribed code.

4 Claims, 8 Drawing Sheets

| \|I(k)\| | 7 | 6 | 5 | 4 | 3 | 2 | 1 | 0 |
|---|---|---|---|---|---|---|---|---|
| W[I(k)] | 70.13 | 22.19 | 12.38 | 7.00 | 4.00 | 2.56 | 1.13 | -0.75 |

W[I(K)] CORRESPONDENCE TABLE

RANGE OF PREDICTION SIGNAL Se(K)

CHARACTERISTICS OF THE PEAK PREDICTION COEFFICIENT $a_l(K)$

| \|I(k)\| | 7 | 6 | 5 | 4 | 3 | 2 | 1 | 0 |
|---|---|---|---|---|---|---|---|---|
| F[I(k)] | 7 | 3 | 1 | 1 | 1 | 0 | 0 | 0 |

F[I(K) CORRESPONDENCE TABLE

DIGITAL WIRELESS COMMUNICATIONS DEVICE

BACKGROUND

The present invention relates to a digital wireless communications device, and more particularly, to an improvement technology for increasing call distance, while avoiding mute processing as far as possible, even if a code error occurs in the ADPCM code.

The ADPCM (Adaptive Differential Pulse Code Modulation) method is commonly used as a voice encoding method for digital cordless telephones. One characteristic of the ADPCM encoding method is that, if a coding error occurs in the voice data due to the effects of weak field strength, fading, electromagnetic interference, or the like, then a sudden clicking noise which is disturbing to the ear is generated, and hence the voice quality is markedly degraded. In Japanese Patent Laid-open No. 2002-006890 and Japanese Patent Laid-open No. 2002-006891, the present applicants have proposed a voice quality improvement device for correcting encoding by monitoring internal variables of the ADPCM decoder, predicting the occurrence of click noises, and estimating the bit error position of the ADPCM code.

FIG. 12 is a functional block diagram of a conventional voice quality improvement device. If the occurrence of an error is detected in the reception signal by means of a frame error check, such as a Cyclic Redundancy Check, or the like, then a substitution unit 45 predicts the occurrence of clicking noise if the short term average $d_{ms}(k)$ of the absolute value of the ADPCM code l(k) exceeds a prescribed threshold value within a data section previously determined by the judgment time adjusting section 44. In this case, the substitution unit substitutes the ADPCM code l(k) with the code l'(k) which produces a minimum change in the short term average of the absolute value of the ADPCM code l(k). The codes l(k) or l'(k) are input to the ADPCM decoder 46 and are converted into a PCM signal $s_o(k)$. An F[l] converter 41 converts the code l(k) to the code F[l(k)], in accordance with the correspondence relationships illustrated in FIG. 13, and it outputs same to a short term average calculating section 42. In the short term average calculating section 42, $d_{ms}(k)$ is calculated by means of the calculation $d_{ms}(k)=(1-2^{-5})\, d_{ms}(k-1)+2^{-5}F[l(k)]$. $d_{ms}(k-1)$ is obtained by passing the output $d_{ms}(k)$ of the short term average calculating section 42 through a delay unit 43. Here, the value of F[l(k)] is defined as shown in FIG. 13.

SUMMARY

Since the ADPCM code changes between various patterns, with change in the sound characteristics, such as the voice or tone, and the frequency or level of the signal, it is difficult to predict click noise accurately by monitoring the short term average value $d_{ms}(k)$ alone. Therefore, in many cases, the threshold value is lowered intentionally to a value which facilitates the detection of click noise and the ADPCM code is substituted with "1111".

In the case of a digital cordless telephone, normally, there is one parent device forming a base station, and therefore, in order to improve voice quality, it is important to increase the call distance between the parent device and the subsidiary device, while avoiding mute processing as far as possible, even if error occurs in the voice data.

The present invention resolves such problems, by providing a digital wireless communications device whereby the call distance can be increased while avoiding mute processing as far as possible, even if error occurs in the ADPCM code.

The invention in one aspect relates to a digital wireless communications device including: an error detector for detecting code error in an ADPCM code received via a wireless circuit; an ADPCM decoder for generating a PCM signal by decoding the ADPCM code; and a substitution unit for determining that a click noise is generated if the high-speed scale factor and the low-speed scale factor determined by the ADPCM decoder within a predetermined time period after the error detector has judged that there is a code error in the ADPCM code, and the received ADPCM code itself, respectively exceed prescribed threshold values, and for substituting the ADPCM code with a predetermined prescribed code. Generation of click noise is predicted on the basis of the value of the high-speed scale factor, the low-speed scale factor and the ADPCM code, and by substituting the ADPCM code with a code that does not produce click noise, it is possible to increase the call distance while avoiding mute processing, as far as possible.

In the digital wireless communications device according to the present invention, desirably, a plurality of threshold values are set previously for the low-speed scale factor, and a plurality of threshold values are set for the high-speed scale factor, with respect to each of the threshold values for the low-speed scale factor, in accordance with the absolute value of the ADPCM code. Since the ADPCM code changes between various different patterns with change in the sound characteristics, such as the voice or tone, and the frequency or level of the signal, then by preparing a plurality of threshold values respectively for the low-speed scale factor and the high-speed scale factor, it is possible to predict the occurrence of click noise accurately.

In the digital wireless communications device according to the present invention, desirably, the threshold value for the high-speed scale factor is set to a higher value, as the threshold value for the low-speed scale factor becomes higher. This is because the low-speed scale factor can be approximated by passing the high-speed scale factor through a low-pass filter.

In the digital wireless communications device according to the present invention, desirably, the threshold value for the high-speed scale factor is set to a lower value, as the absolute value of the ADPCM code becomes higher. Since the rate of increase of the high-speed scale factor becomes greater as the absolute value of the ADPCM code becomes higher, this is effective in detecting click noise.

The invention in another aspect relates to a digital wireless communications device that includes: an error detector for detecting code error in an ADPCM code received via a wireless circuit; an ADPCM decoder for generating a PCM signal by decoding the ADPCM code; and a prediction signal limiter for substituting a prediction signal determined by the ADPCM decoder for the next sampling with the PCM output signal for the previous sampling, if the received input frequency is higher than a predetermined frequency (for example, 1500 Hz) within a predetermined time period after the error detector has judged that there is a code error in the ADPCM code, if the PCM output signal in the previous sampling is a maximum level, and if the prediction signal is the inverse code of the PCM output signal in the previous sampling. By substituting code in such a manner that the code of the prediction signal is not inverted, it is possible to suppress mute processing to a minimum, and hence the call distance can be increased.

The invention in a further aspect relates to a digital wireless communications device that includes: an error detector for detecting code error in an ADPCM code received via a wireless circuit; an ADPCM decoder for generating a PCM signal by decoding the ADPCM code; and a prediction signal limiter for substituting a prediction signal determined by the ADPCM decoder for the next sampling with the PCM output signal for the previous sampling, if the received input frequency is higher than a predetermined frequency (for example, 1500 Hz) within a predetermined time period after the error detector has judged that there is a code error in the ADPCM code, if the PCM output signal in the previous sampling is a maximum level, and if the prediction signal is the inverse code of the PCM output signal in the previous sampling and is of a level delimited by the 14-bit output limiter of the ADPCM decoder. By substituting code in such a manner that the code of the prediction signal is not inverted, it is possible to suppress mute processing to a minimum, and hence the call distance can be increased.

In such digital wireless communications device according to the present invention, the prediction signal limiter identifies whether or not the received input frequency is the predetermined frequency, by using a peak prediction coefficient determined by the ADPCM decoder.

Other aspects, features and alternative embodiments of the invention will be more fully apparent from the ensuing disclosure and appended claims.

DETAILED DESCRIPTION

Figure 1:
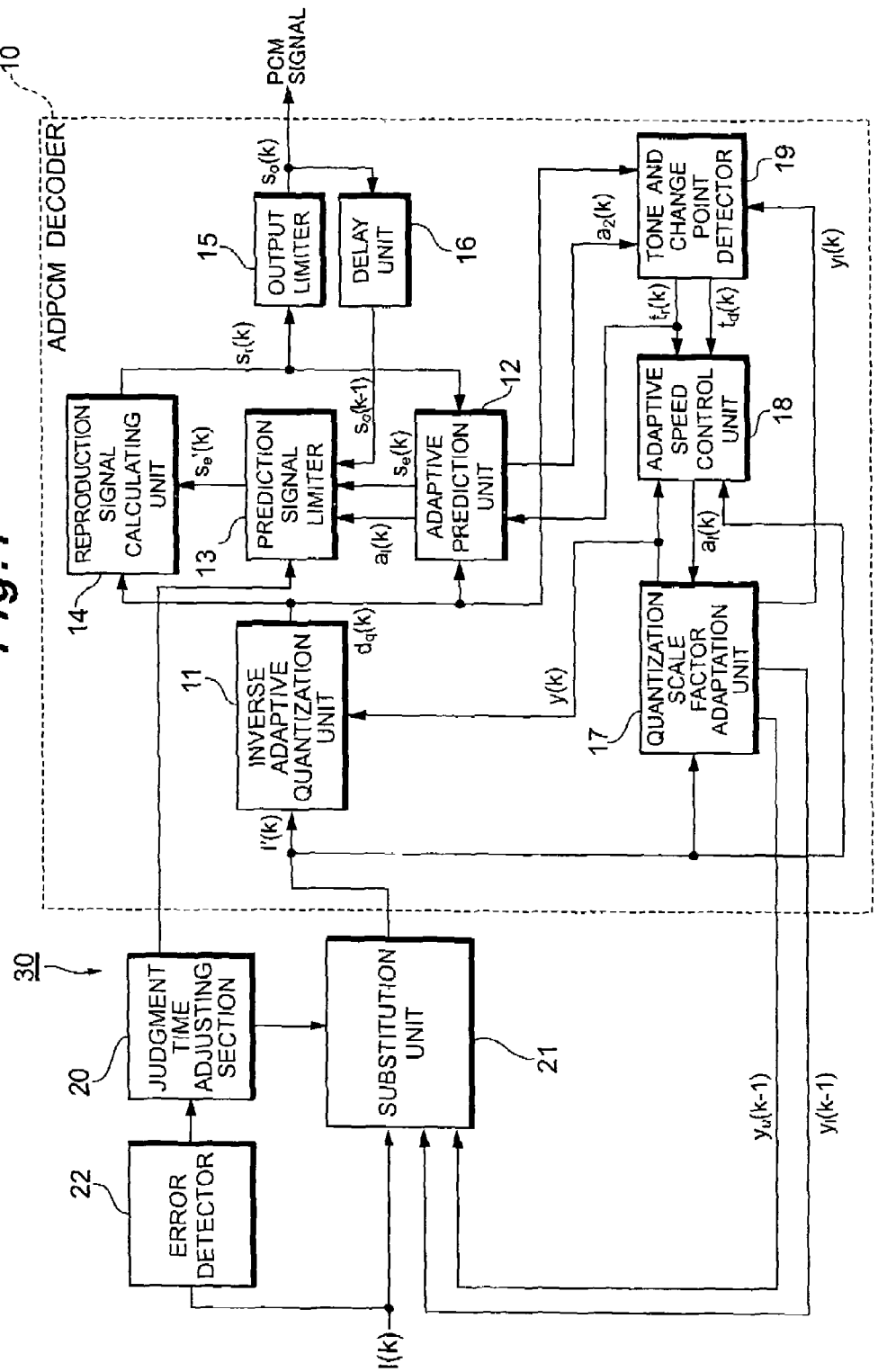
FIG. 1 is a compositional diagram of an ADPCM decoder according to one embodiment of the present invention.

FIG. 1 is a system composition diagram centered on an ADPCM decoder 10 installed in a digital wireless communications device (for example, a cordless telephone, or the like) 30 according to one embodiment of the present invention. The ADPCM decoder 10 is constituted by an inverse adaptive quantization unit 11, an adaptive prediction unit 12, a prediction signal limiter 13, a reproduction signal calculating unit 14, an output limiter 15, a delay unit 16, a quantization scale factor adaptation unit 17, an adaptive speed controller 18, and a detector 19.

If an error detector 22 detects a frame error in the received ADPCM code l(k) by means of a Cyclic Redundancy Check, or the like, then it outputs a frame error detection signal to a judgment time adjusting section 20. If a frame error is detected, the judgment time adjusting section 20 outputs an error detection signal to the substitution unit 21 and the prediction signal limiter 13, in order to adjust the valid time for the internal processing in the substitution unit 21 and the prediction signal limiter 13. This internal processing is signal substitution processing for suppressing mute processing due to the occurrence of click noise (as described hereinafter in greater detail). If an error detection signal is received from the judgment time adjusting section 20, the substitution unit 21 and the prediction signal limiter 13 perform the internal processing described above in respect of a prescribed number of frames.

When an error detection signal is received from the judgment time adjusting section 20, if prescribed conditions are satisfied on the basis of the high-speed scale factor yu(k), the low-speed scale factor yl(k), and the ADPCM code l(k), then the substitution unit 21 substitutes the ADPCM code l(k) with a prescribed code l'(k). At the transmitter, the ADPCM code l(k) is obtained by quantizing the differential signal d(k) of a prediction signal and a quantized PCM signal, and then encoding and transmitting the quantized differential signal d(k). More specifically, in the adaptive quantization unit on the transmitter side, the differential signal d(k) is converted to a base 2 logarithm, and is then normalized by means of the scale factor y(k). The value thus obtained, $\log_2(d(k))-y(k)$, is quantized and converted to a code, thereby generating the ADPCM code l(k).

The inverse adaptive quantization unit 11 generates a quantized differential signal dq(k) on the basis of the ADPCM code l(k) (or l'(k)) and the quantization scale factor y(k), and it outputs the quantized differential signal dq(k) to the adaptive prediction unit 12, the reproduction signal calculating unit 14 and the detection unit 19. The adaptive prediction unit 12 generates a prediction signal se(k), a peak prediction coefficient $a1(k)$ and a peak prediction coefficient $a2(k)$, on the basis of the quantized differential signal dq(k) and the speed variable tr(k). If prescribed conditions are satisfied with respect to the values of the peak prediction coefficient $a1(k)$, the PCM signal for the previous sampling, so(k−1), and the prediction signal se(k), then the prediction signal limiter 13 substitutes the prediction signal se(k) with the prescribed code se'(k). The reproduction signal calculating unit 14 generates a reproduction signal sr(k) on the basis of the quantized differential signal dq(k), and the prediction signal se(k) (or se'(k)). The output limiter 15 compresses the 16-bit reproduction signal sr(k) into a 14-bit PCM signal so(k). The delay unit 16 outputs the PCM signal, so(k−1), of the sampling period previous to the PCM signal so(k), to the prediction signal limiter 13. The quantization scale factor adaptation unit 17 generates a scale factor y(k), a high-speed scale factor yu(k), and a low-speed scale factor yl(k), on the basis of the ADPCM code l(k) (or l'(k)), and the adaptive speed control variable al(k). The scale factor y(k), the high-speed scale factor yu(k) and the low-speed scale factor yl(k) are generated by means of the following equations:

$$y(k)=al(k)\cdot yu(k-1)+[1-al(k)]\cdot yl(k-1) \quad (1)$$

$$yu(k)=(1-2^{-5})\cdot y(k)+2^{-5}\cdot W[l(k)] \quad (2)$$

$$yl(k)=(1-2^{-6})\cdot yl(k)+2^{-6}yu(k) \quad (3)$$

Figures 2, 3:
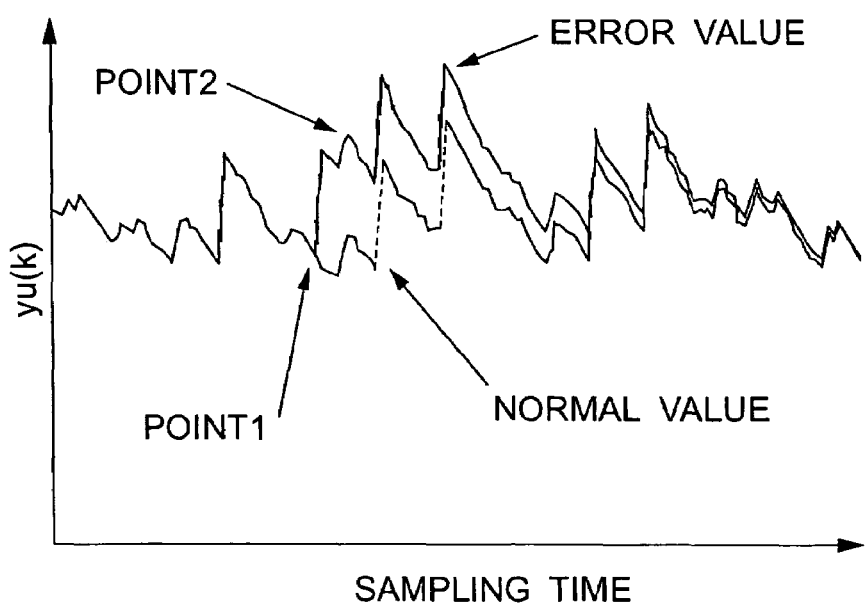
FIG. 2 is a diagram showing the correspondences between the absolute value of l(k) and W[l(k)]
FIG. 3 is a comparative graph of yu(k) during normal operation and in the event of an error.

The value of W[l(k)] is defined as shown in FIG. 2. The high-speed scale factor yu(k) corresponds to a signal showing a large variation in l(k) (for example, a voice signal), and a low-speed scale factor yl(k) corresponds to a signal showing a small variation in the l(k) (for example, a tone signal).

The quantization scale factor adaptation unit 17 outputs the scale factor y(k) to the adaptive quantization unit 11, and outputs the low-speed scale factor yl(k) to the detector 19. Moreover, the quantization scale factor adaptation unit 17 outputs the high-speed scale factor yu(k−1) and the low-speed scale factor yl(k−1) for the previous sampling period, to the substitution unit 21. The adaptive speed controller 18 generates an adaptive speed control variable al(k), on the basis of the scale factor y(k), the ADPCM code l(k) (or l'(k)), the speed variable tr(k), and the control variable td(k). The tone and change point detector 19 generates a speed variable tr(k) and a control variable td(k) on the basis of the peak prediction coefficient a2($k$), the quantized differential signal dq(k) and the low-speed scale factor yl(k).

The aforementioned signals are all sampled digital signals, and the letter k in parenthesis after each signal indicates the sampling time.

FIG. 3 is a comparative graph showing the behavioral change of yu(k) at respective sampling times, under normal circumstances and when an error occurs. The dotted line shows the normal behavior when no error is input, and the solid line shows the behavior when an error is input intentionally. It can be seen that if a code "0111" having the highest rate of increase in W[l(k)] is input as an error (if l(k) is substituted by "0111") at point 1, then consequently, at point 2, a click noise starts to occur. From this, it can be seen that the occurrence of a click noise is not necessarily limited to the time at which the signal error in l(k) occurs. Furthermore, looking at the behavior of yu(k) under normal circumstances, it can be confirmed that it changes in the shape of a saw tooth. Therefore, it can be seen that when a code l(k) showing a large differential is input, previously to this, an l(k) showing a small change in W[l(k)] has been input and the value of yu(k) has been small. The following reason can be surmised to explain why click noise occurs at point 2, slightly after point 1, rather than at point 1 where the code error in l(k) is generated. More specifically, at point 1, l(k) is substituted by a code containing a large differential in the W[l(k)] value, but since the value of yu(k) is sufficiently small at this point, no click noise is generated. However, at point 2, although no code error is generated in l(k), an l(k) code is input which has a large differential in the W[l(k)] value with respect to the value of yu(k), and this is thought to be the reason why click noise is generated at this point. Following this premise, it can be postulated that, if a threshold value is set previously for yu(k), then by performing code substitution for l(k) in a direction which reduces the value of yu(k) in cases where the value of yu(k) exceeds the threshold value due to occurrence of an error, and where an l(k) code showing a high rate of increase in W[l(k)] is input, it is possible to suppress the occurrence of click noise.

Figure 4:
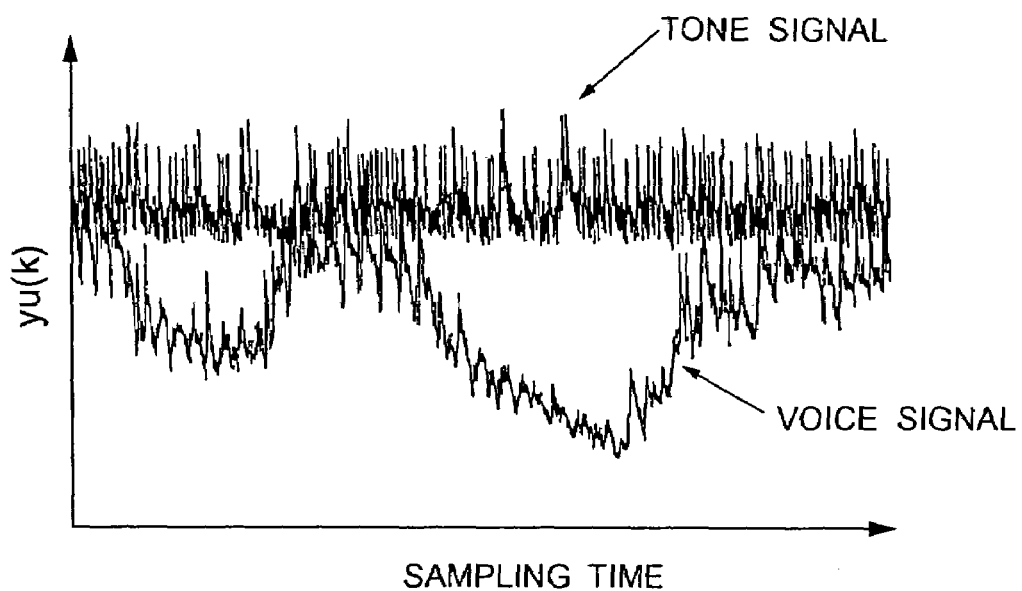
FIG. 4 is a graph of yu(k) at respective sampling times.
Figure 5:
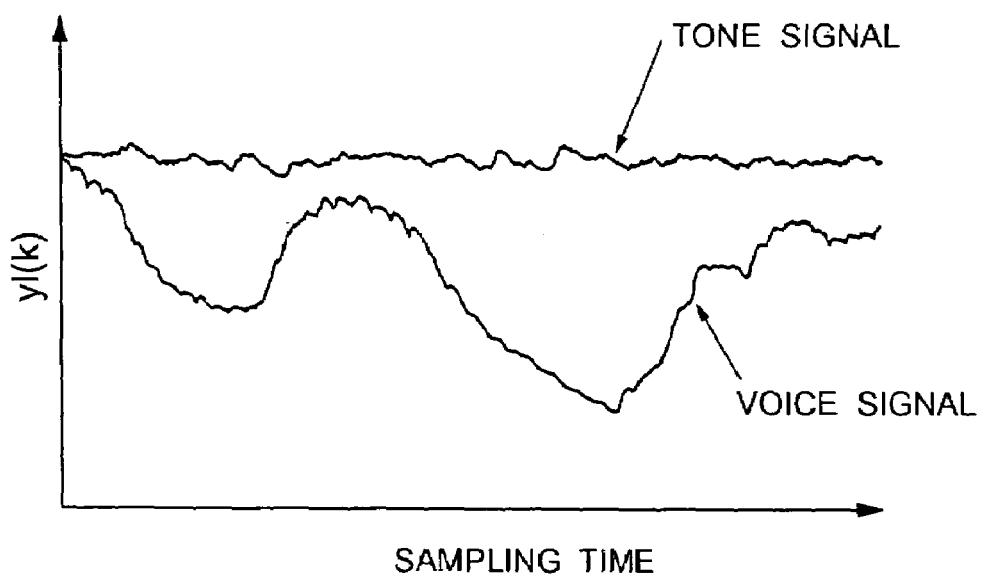
FIG. 5 is a graph of yl(k) at respective sampling times.

FIG. 4 is a comparative graph showing the change in behavior of yu(k) at respective sampling times, when a 1 kHz tone signal and a voice signal are input. FIG. 5 is a comparative graph showing the change in behavior of yl(k) at respective sampling times when a 1 kHz tone signal and a voice signal are input. By comparing these two graphs, when the input signal is a voice signal, the respective values of yu(k) and yl(k) show relatively large but gradual variation, whereas when the input signal is a tone signal, the respective values of yu(k) and yl(k) are approximately uniform and show small variations. This uniform value varies with the frequency and level of the input signal, and the lower the frequency and the lower the signal level, the lower the value becomes. Furthermore, the value of yl(k) approximates the value obtained by passing yu(k) through a low-pass filter. In this way, yu(k) and yl(k) show different types of variations, depending on the frequency, level and other characteristics of the input signal, and therefore it is difficult to detect click noise by adopting a composition where only one threshold value is provided respectively for yu(k) and yl(k).

Figure 6:
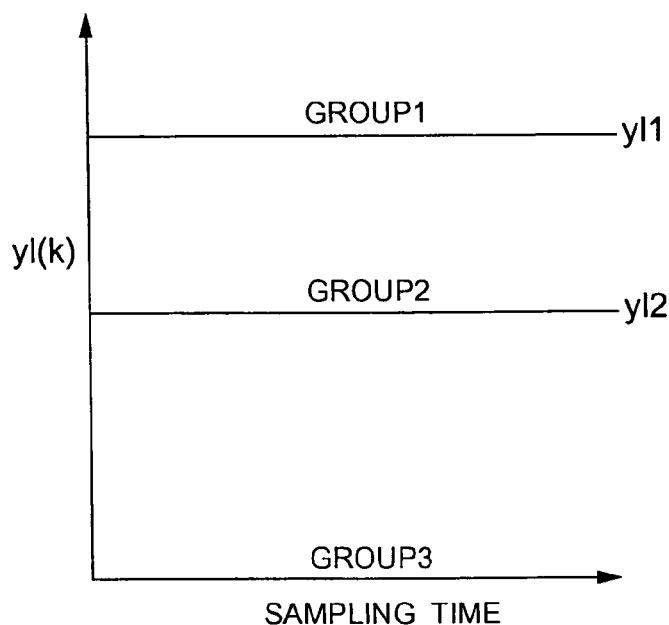
FIG. 6 is an illustrative diagram of threshold values for yl(k)
Figure 7:
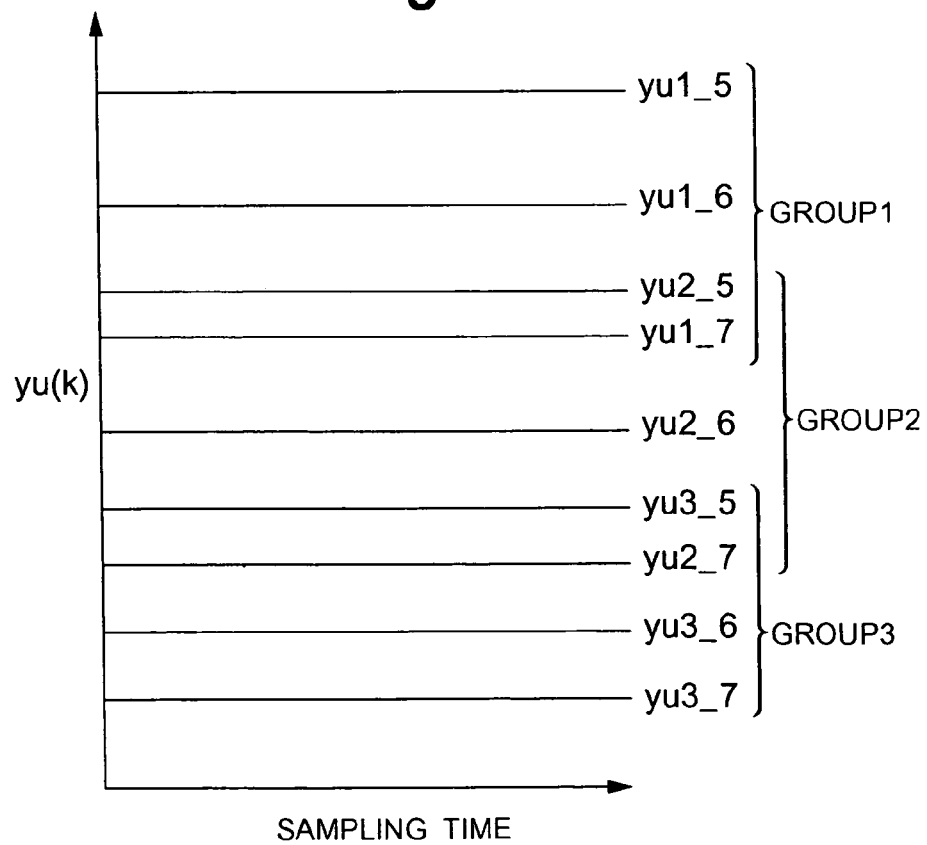
FIG. 7 is an illustrative diagram of threshold values for yu(k)

Accordingly, in the present embodiment, a plurality of threshold values are established for combinations of the two parameters, yu(k) and yl(k). More specifically, as shown in FIG. 6, a plurality of threshold values yl1 and yl2 are established for yl(k). If yu(k) is greater than yl1 (group 1), then as shown in FIG. 7, the plurality of threshold values yu1_7, yu1_6 and yu1_5 are established for yu(k), corresponding respectively to the absolute values 7, 6, 5 of l(k) at which the rate of increase of W[l(k)] is relatively high. If yu(k) is greater than or equal to yl1 and less than or equal to yl2 (group 2), then the plurality of threshold values yu2_7, yu2_6 and yu2_5 are established for yu(k), corresponding respectively to the absolute values 7, 6, 5 of l(k) at which the rate of increase of W[l(k)] is relatively high. If yu(k) is less than yl2 (group 3), then the plurality of threshold values yu3_7, yu3_6 and yu3_5 are established for yu(k), corresponding respectively to the absolute values 7, 6, 5 of l(k) at which the rate of increase of W[l(k)] is relatively high.

Here, since yl(k) can be approximated to a case where yu(k) is passed through a low-pass filter, then it can be considered that if the value of yl(k) is large, the value of yu(k) will also be large, whereas if the value of yl(k) is small, the value of yu(k) will also be small. The threshold values for yu(k) may be partially overlapping between the respective groups, but as a general tendency, the threshold values for yu(k) in group 1 are greater than the threshold values for yu(k) in group 2, and the threshold values for yu(k) in group 2 are greater than the threshold values for yu(k) in group 3. Furthermore, since the rate of increase in W[l(k)] becomes smaller in sequence, as absolute value of l(k) value changes from 7 to 6 to 5, then the threshold values for yu(k) in group 1 are such that yu1_7<yu1_6<yu1_5, the threshold values for yu(k) in group 2 are such that yu2_7<yu2_6<yu2_5, and the threshold values for yu(k) in group 3 are such that yu3_7<yu3_6<yu3_5. However, the number of threshold values and the overlap between the threshold values for different groups, and the like, can be changed appropriately.

If the size relationship between the threshold value for yu(k) determined according to the value of yl(k), and the value of yu(k−1) satisfies a prescribed condition, then the substitution unit 21 substitutes l(k) with l'(k). l'(k) is a code other than "1111", and desirably it is a code which reduces the rate of increase in W[l(k)]. For example, codes having an absolute value of 1 or 2, in other words, "0001" or "0010" are suitable (or in a negative case, codes of "1110" or "1101" respectively). By substituting the code in this way, it is possible to eliminate mute time as far as possible.

Figure 8:
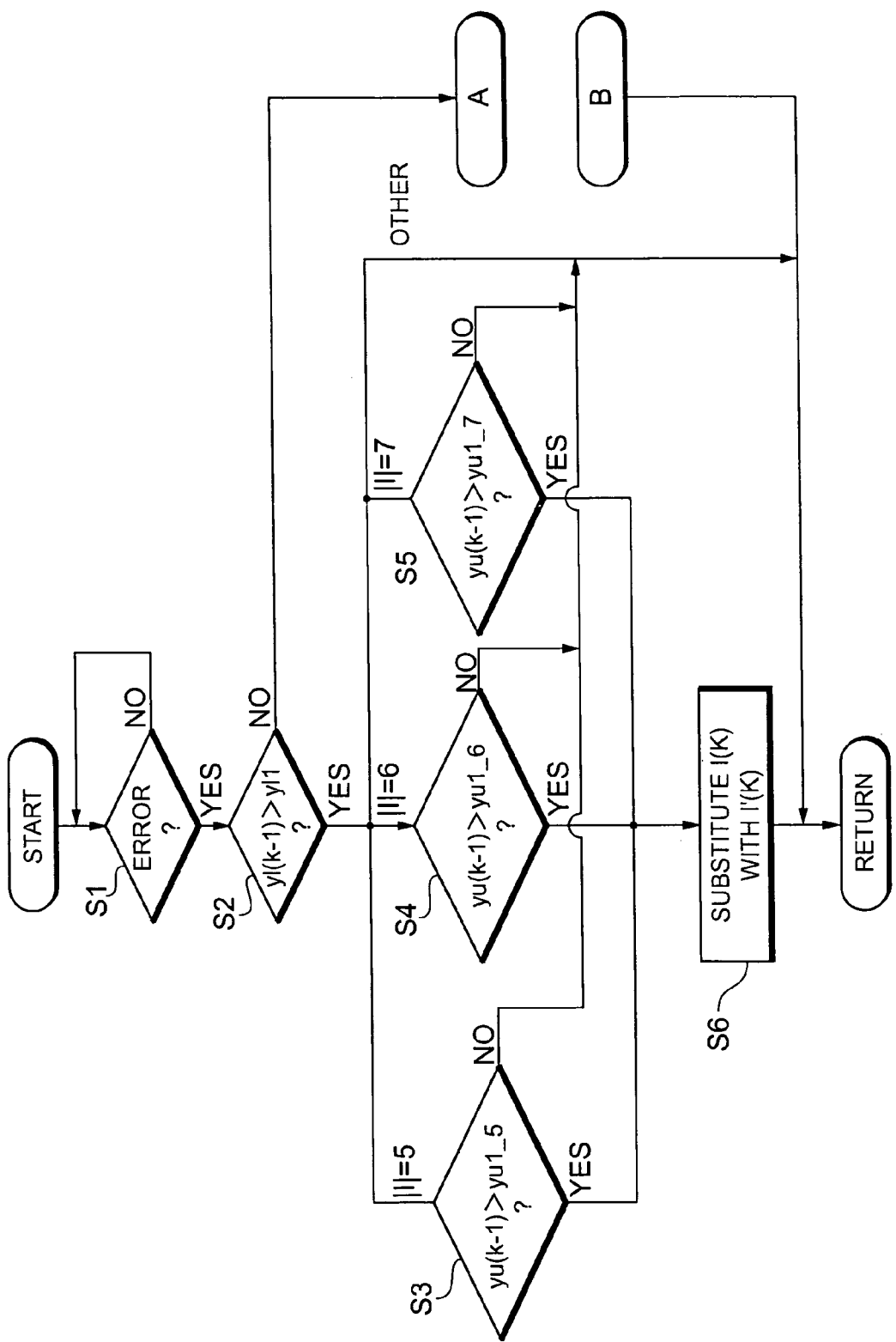
FIG. 8 shows a processing flow for code substitution.
Figure 9:
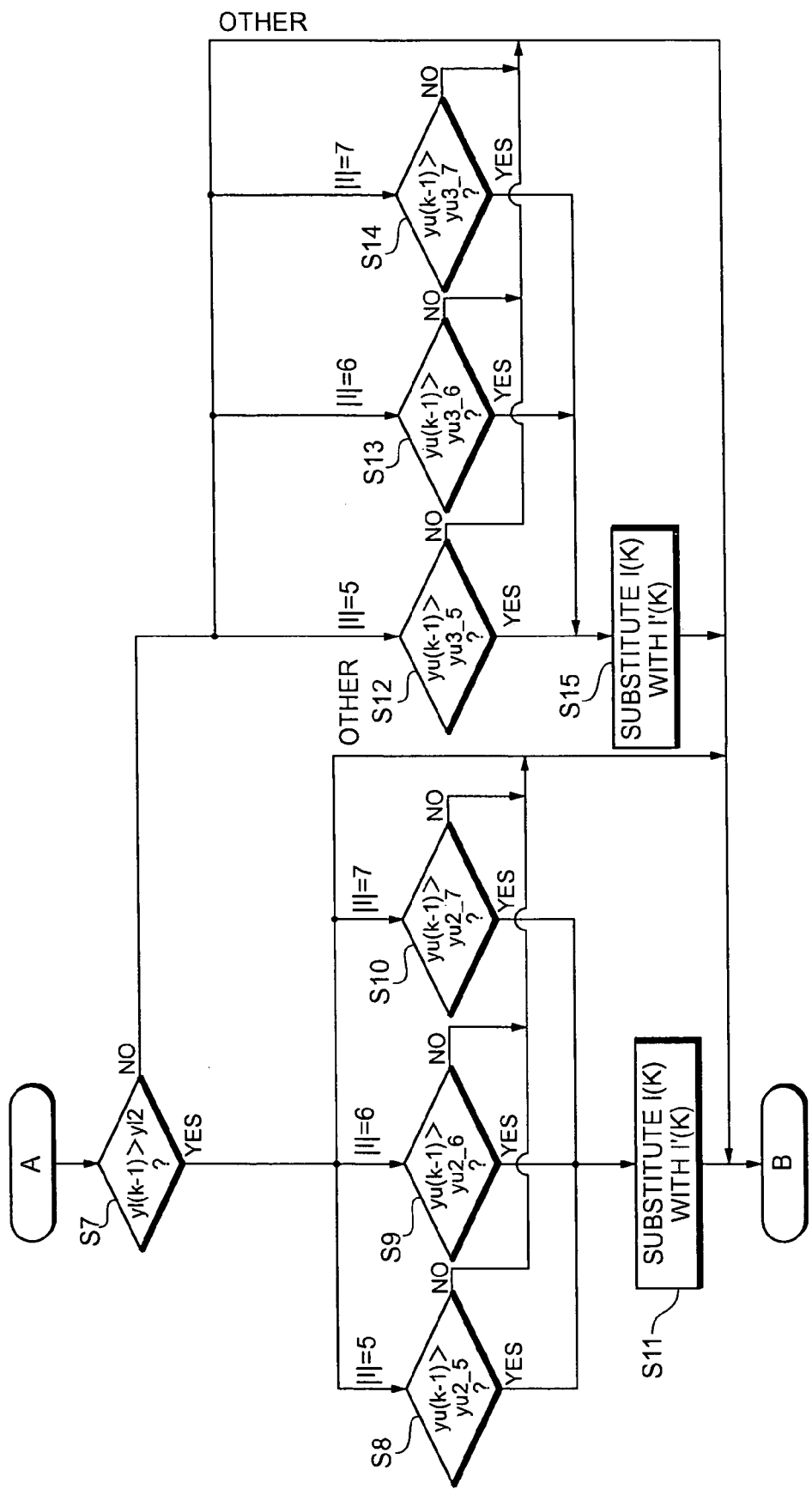
FIG. 9 shows a processing flow for code substitution.

The processing flow for the aforementioned code substitution is now described with reference to FIG. 8 and FIG. 9. This processing flow is executed internally by the substitution unit 21. If the substitution unit 21 receives an error detection signal from the judgment time adjusting section 20 (S1: YES), then it checks whether or not yl(k−1)>yl1 (S2). If yl(k−1)>yl1 (S2: YES) and the absolute value of l(k) is 5, then it checks whether or not yu(k−1)>yu1_5 (S3). If yu(k−1) >yu1_5 (S3: YES), then it substitutes l(k) with l'(k) (S6), and if yu(k−1)≦yu1_5 (S3: NO), then it leaves the processing flow and returns to S1. If yl(k−1)>yl1 (S2: YES) and the absolute value of l(k) is 6, then the substitution unit 21 checks whether or not yu(k−1)>yu1_6 (S4). If yu(k−1)>yu1_6 (S4: YES), then it substitutes l(k) with l'(k) (S6), and if yu(k−1) ≦yu1_6 (S4: NO), then it leaves the processing flow and returns to S1. If yl(k−1)>yl1 (S2: YES) and the absolute value of l(k) is 7, then the substitution unit 21 checks whether or not yu(k−1)>yu1_7 (S5). If yu(k−1)>yu1_7 (S5: YES), then it substitutes l(k) with l'(k) (S6), and if yu(k−1)≦yu1_7 (S5: NO), then it leaves the processing flow and returns to S1.

If yl(k−1)≦yl1 (S2: NO), then the substitution unit 21 checks whether or not yl(k−1)>yl2 (S7). If yl(k−1)>yl2 (S7: YES) and the absolute value of l(k) is 5, then it checks whether or not yu(k−1)>yu2_5 (S8). If yu(k−1)>yu2_5 (S8: YES), then the substitution unit 21 substitutes l(k) with l'(k) (S11), and if yu(k−1)≦yu2_5 (S8: NO), then it leaves the processing flow and returns to S1. If yl(k−1)>yl2 (S7: YES) and the absolute value of l(k) is 6, then the substitution unit 21 checks whether or not yu(k−1)>yu2_6 (S9). If yu(k−1)>yu2_6 (S9: YES), it substitutes l(k) with l'(k) (S11), and if yu(k−1)≦yu2_6 (S8: NO), then it leaves the processing flow and returns to S1. If yl(k−1)>yl2 (S7: YES) and the absolute value of l(k) is 7, then the substitution unit 21 checks whether or not yu(k−1)>yu2_7 (S10). If yu(k−1)>yu2_7 (S10: YES), then it substitutes l(k) with l'(k), and if yu(k−1)≦yu2_7 (S10: NO), then it leaves the processing flow and returns to S1.

If yl(k−1)≦yl2 (S7: NO) and the absolute value of l(k) is 5, then the substitution unit 21 checks whether or not yu(k−1)>yu3_5 (S12). If yu(k−1)>yu3_5 (S12: YES), then it substitutes l(k) with l'(k) (S15), and if yu(k−1)≦yu3_5 (S12: NO), then it leaves the processing flow and returns to S1. If the absolute value of l(k) is 6, then the substitution unit 21 checks whether or not yu(k−1)>yu3_6 (S13). If yu(k−1)>yu3_6 (S13: YES), then it substitutes l(k) with l'(k) (S15), and if yu(k−1)≦yu3_6 (S13: NO), then it leaves the processing flow and returns to S1. If the absolute value of l(k) is 7, the substitution unit 21 checks whether or not yu(k−1)>yu3_7 (S14). If yu(k−1)>yu3_7 (S14: YES), it substitutes l(k) with l'(k) (S15), and if yu(k−1)≦yu3_7 (S14: NO), it leaves the processing flow and returns to S1.

Figure 10:
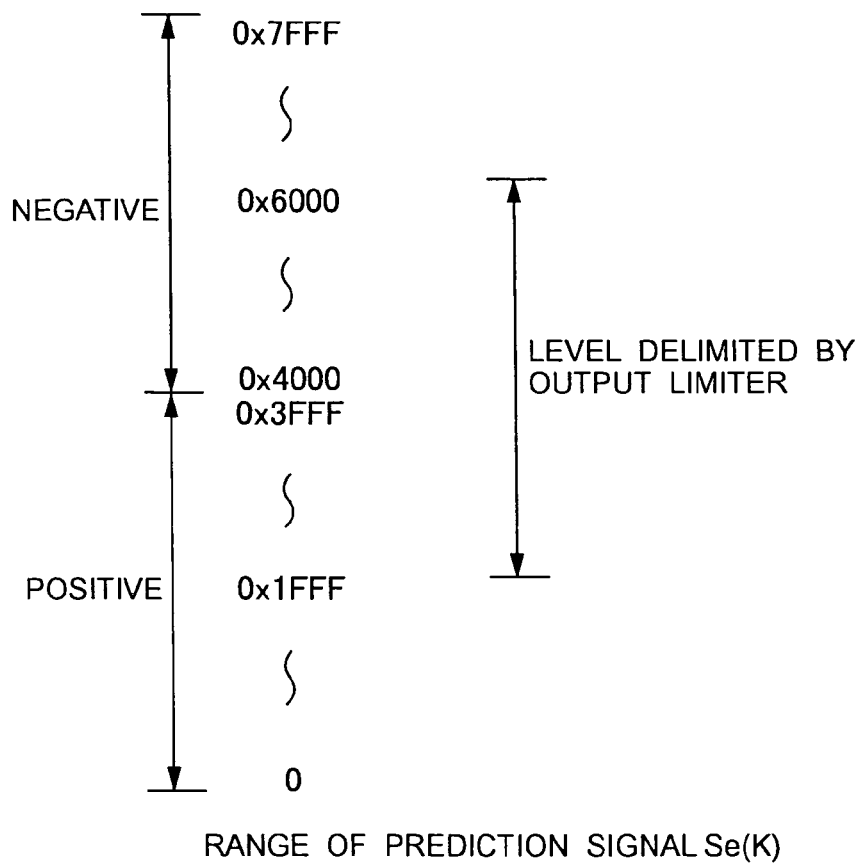
FIG. 10 is an illustrative diagram showing the range of the prediction signal se(k)
Figure 11:
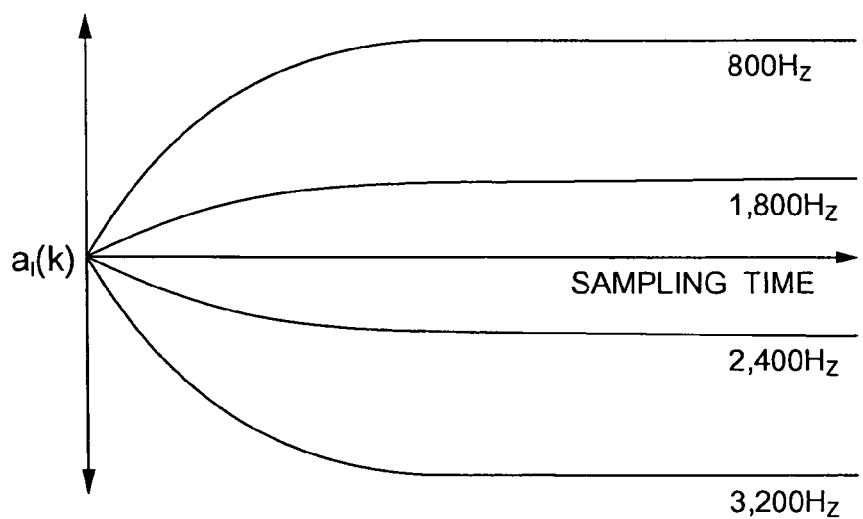
FIG. 11 is a graph showing characteristics curves for the peak prediction coefficient $a_1(k)$.
Figures 12, 13:
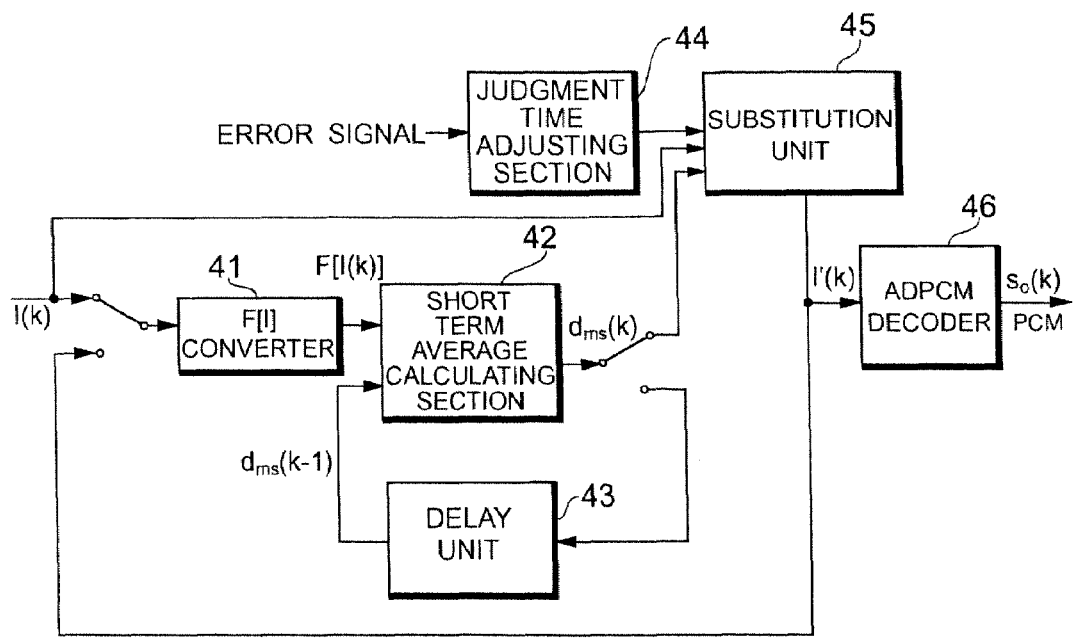
FIG. 12 is a functional block diagram of a conventional voice quality improvement device.
FIG. 13 is a diagram showing the correspondences between the absolute value of l(k) and F[l(k)].

Next, the code substitution processing for the prediction signal se(k) in the prediction signal limiter 13 is described. The reproduction signal sr(k) is determined by the sum of the quantized differential signal dq(k) and the prediction signal se(k), and it is ascertained that click noise will be generated by code inversion of the prediction signal se(k). As shown in FIG. 10, se(k) is expressed in two's complement notation of 15 bits. 0x3FFF is the maximum positive value and 0 is the minimum positive value. 0x7FFF is the maximum negative value and 0x4000 is the minimum negative value. The range of 0x6000-0x1FFF is the range delimited by the output limiter 15. If there is a code error in se(k), and correlation with the subsequent input signal cannot be achieved, then se(k) will exceed the maximum positive value, causing an overflow, and hence the code is inverted to obtain a negative value. Normally, it is not probable that a signal of several 100 Hz to less than 1500 Hz will change from the maximum level to an inverted code in one sampling period, and therefore, if the PCM signal so(k−1) of the previous sampling is at the maximum 14-bit level, and se(k) is the same as the value of so(k−1) when the code is inverted, then the prediction signal limiter 13 substitutes the value of se(k) with a value equal to so(k−1). On the other hand, at a frequency in excess of 1500 Hz, the number of samplings per cycle is small, so it is difficult to distinguish the actual sample point from another point, simply from the fact that code inversion has occurred. Since a signal in the audible waveband is not liable to shift from the maximum level to the maximum level of the inverted code in one sampling, then in the case of high-frequency signals of 1500 Hz or above, if the signal so(k−1) for the previous sampling is at the maximum 14-bit level, if se(k) is equal to the value of so(k−1) when code inverted, and if the value of se(k) is a value in the range delimited by the output limiter 15 (the range from 0x6000-0x1FFF), then the prediction signal limiter 13 substitutes the value of se(k) with a value equal to so(k−1). As shown in FIG. 11, since the peak prediction coefficient $a_1(k)$ tends to follow the frequency, it is possible to judge whether the frequency of the received input signal is 1500 Hz or above, by using the value of $a_1(k)$.

According to the present embodiment, if a code error occurs in a received ADPCM code l(k), then mute processing can be restricted to a minimum, by substituting l(k) with a code l'(k) which produces a lower rate of increase in W[l(k)], using the substitution unit 21, and hence a beneficial effect is obtained in that the call distance can be increased. Furthermore, mute processing is also restricted to a minimum by providing a new prediction signal limiter 13, which also enables the call distance to be increased.

While the invention has been described herein with reference to illustrative features and embodiments, other variations, modifications and alternative embodiments of the invention will readily suggest themselves to those of ordinary skill in the art based on the disclosure herein, and therefore are to be regarded as being within the spirit and scope of the invention.

I claim:

1. A digital wireless communications device, comprising:
an error detector for detecting code error in an adaptive differential pulse code modulation (ADPCM) code received via a wireless circuit; an ADPCM decoder for generating a pulse code modulation (PCM) signal by decoding said ADPCM code;
and a substitution unit for determining that a click noise is generated if a high-speed scale factor and a low-speed scale factor determined by said ADPCM decoder within a predetermined time period after said error detector has judged that there is a code error in the ADPCM code, and the received ADPCM code itself, respectively exceed prescribed threshold values, and for substituting said ADPCM code with a predetermined prescribed code.

2. The digital wireless communications device according to claim 1,
wherein a plurality of threshold values are set previously for the low-speed scale factor;
and a plurality of threshold values are set for the high-speed scale factor, with respect to each of the threshold values for the low-speed scale factor, in accordance with the absolute value of said ADPCM code.

3. The digital wireless communications device according to claim 2,
wherein the threshold value for the high-speed scale factor is set to a higher value, as the threshold value for the low-speed scale factor becomes higher.

4. The digital wireless communications device according to claim 2,
wherein the threshold value for the high-speed scale factor is set to a lower value, as the absolute value of the ADPCM code becomes higher.

* * * * *